(12) United States Patent
Eibl et al.

(10) Patent No.: US 9,827,632 B2
(45) Date of Patent: Nov. 28, 2017

(54) DEVICE AND METHOD FOR GENERATIVE COMPONENT PRODUCTION

(71) Applicant: FRAUNHOFER-GESELLSCHAFT ZUR FOERDERUNG DER ANGEWANDTEN FORSCHUNG E.V., Munich (DE)

(72) Inventors: Florian Eibl, Aachen (DE); Yves-Christian Hagedorn, Aachen (DE); Lucas Jauer, Herzogenrath (DE); Wilhelm Meiners, Aachen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/647,509

(22) PCT Filed: Jul. 9, 2014

(86) PCT No.: PCT/EP2014/001879
§ 371 (c)(1),
(2) Date: May 27, 2015

(87) PCT Pub. No.: WO2015/003804
PCT Pub. Date: Jan. 15, 2015

(65) Prior Publication Data
US 2016/0114427 A1    Apr. 28, 2016

(30) Foreign Application Priority Data

Jul. 11, 2013   (DE) .................. 10 2013 011 676

(51) Int. Cl.
*B23K 26/08*    (2014.01)
*B23K 26/342*    (2014.01)
(Continued)

(52) U.S. Cl.
CPC ........ *B23K 26/0876* (2013.01); *B22F 3/1055* (2013.01); *B23K 26/0081* (2013.01);
(Continued)

(58) Field of Classification Search
CPC ..................... B23K 20/0876; B23K 26/342; B23K 24/144; B22F 3/1055; B22F 2003/1057
(Continued)

(56) References Cited

U.S. PATENT DOCUMENTS

| 5,508,489 A | 4/1996 | Benda et al. ............ 219/121.76 |
| 6,215,093 B1 | 4/2001 | Meiners et al. ......... 219/121.61 |

(Continued)

FOREIGN PATENT DOCUMENTS

| DE | 196 49 865 C1 | 2/1998 | .............. B22F 3/105 |
| DE | 10 2010 048 335 A1 | 4/2012 | .............. B22C 7/00 |

(Continued)

OTHER PUBLICATIONS

International Search Report in corresponding application No. PCT/EP2014/001879 dated Oct. 27, 2014.
(Continued)

*Primary Examiner* — Nahida Sultana
(74) *Attorney, Agent, or Firm* — Renner Kenner Greive Bobak Taylor & Weber

(57) ABSTRACT

The present invention relates to a device for laser-based generative component production. The device comprises a processing head (1), using which a plurality of mutually separate laser beams are directed adjacently and/or overlapping to some extent onto the processing plane, The processing head (1) is moved across the processing plane using a movement apparatus (9), while the mutually separate laser beams are modulated independently of one another in terms of intensity, in order to obtain the desired exposure geometry. The laser power and the dimensional size can be scaled (Continued)

cost effectively during the generative production using the suggested device and the associated method.

12 Claims, 4 Drawing Sheets

(51) Int. Cl.
    *B22F 3/105*     (2006.01)
    *B29C 67/00*     (2017.01)
    *B23K 26/00*     (2014.01)
    *B23K 26/06*     (2014.01)
    *B23K 26/354*     (2014.01)

(52) U.S. Cl.
    CPC ........ *B23K 26/0608* (2013.01); *B23K 26/342* (2015.10); *B23K 26/354* (2015.10); *B29C 67/0077* (2013.01); *B29C 67/0085* (2013.01); *B22F 2003/1056* (2013.01); *B22F 2003/1057* (2013.01); *Y02P 10/295* (2015.11)

(58) Field of Classification Search
    USPC ..... 264/1.26, 1.36, 401, 460, 163, 485, 488, 264/492, 497; 425/375, 174.4
    See application file for complete search history.

(56) References Cited

U.S. PATENT DOCUMENTS

| | | | |
|---|---|---|---|
| 6,861,613 B1 | 3/2005 | Meiners et al. | 219/121.65 |
| 7,128,866 B1 | 10/2006 | Henningsen | 264/401 |
| 2003/0214571 A1 | 11/2003 | Ishikawa et al. | 347/255 |
| 2009/0224432 A1* | 9/2009 | Nagatomo | B23K 26/032 264/400 |
| 2010/0155985 A1* | 6/2010 | McAlea | B29C 35/16 264/113 |
| 2012/0251378 A1* | 10/2012 | Abe | B29C 67/0077 419/55 |
| 2013/0064706 A1 | 3/2013 | Schwarze et al. | 419/1 |
| 2013/0112672 A1 | 5/2013 | Keremes et al. | 219/121.78 |
| 2013/0176375 A1 | 7/2013 | Moench et al. | 34/225 |
| 2015/0014889 A1* | 1/2015 | Goya | B23K 26/38 264/400 |
| 2015/0290741 A1* | 10/2015 | Abe | B29C 67/0077 419/28 |
| 2015/0321255 A1* | 11/2015 | Colin | B22F 3/1055 419/55 |
| 2015/0367574 A1* | 12/2015 | Araie | B29C 67/0077 425/174.4 |
| 2016/0136730 A1* | 5/2016 | McMurtry | G02B 26/101 425/162 |

FOREIGN PATENT DOCUMENTS

| | | | | |
|---|---|---|---|---|
| JP | 2009006509 A | | 1/2009 | .............. B22F 3/105 |
| WO | WO2014/199149 A1 * | | 12/2014 | ......... B29C 67/0077 |

OTHER PUBLICATIONS

Written Opinion in corresponding application No. PCT/EP2014/001879 dated Oct. 27, 2014.

Office Action in corresponding application No. DE 10 2013 011 676.7 dated Apr. 10, 2014.

* cited by examiner

DEVICE AND METHOD FOR GENERATIVE COMPONENT PRODUCTION

CROSS-REFERENCE TO RELATED APPLICATION

This is a §371 application of International patent application number PCT/EP2014/001879 filed Jul. 9, 2014, which claims the benefit of German patent application number 10 2013 011 676.7 filed on Jul. 11, 2013, and which is incorporated herein by reference.

TECHNICAL FIELD OF APPLICATION

The present invention relates to a device and a method for laser-based generative component production.

One example for a laser-based generative production method is selective laser melting (SLM), using which functional components can be produced in layers. Selective laser melting and similar generative production methods offer the possibility to produce components with complex (internal) geometries, which cannot be produced using conventional production methods, such as for example machining or casting methods.

During selective laser melting, the component is divided into layers (typ. <100 µm) starting from a 3D CAD model by means of specialist software. The thereby-generated component information is then provided to the SLM system via standardised data formats and is used as a basis of the production process. A fine-grained powder material, the d50 particle size of which is preferably <100 µm, is generally used as base material. Metals, ceramics or plastics can for example be used as powder materials. The powder material is applied onto a building platform by a coating unit in the required layer thickness. Then, the layer information of the component to be created, which information is present in digital form, is transmitted by means of focussed laser radiation into the powder bed created, in that only defined regions are melted and solidified. By lowering of the building platform and repeated application and melting of the powder, a three-dimensional component is created. In the non-irradiated regions, the powder remains uncompacted and can be prepared and re-used after the process has finished.

PRIOR ART

One example for a device and a method for selective laser melting can for example be drawn from DE 196 49 865 C1. The laser beam for exposure of the regions of the powder layers to be melted is guided across the processing plane in this and other known devices by means of a galvanometer scanner. Focussing generally takes place via an F-theta lens downstream of the scanner or via a vario optical system upstream of the scanner. Previous systems typically have a maximum laser power of 400 W and installation sizes in the x and y direction of 250 mm×250 mm. However, for a broad industrial use of such a production method, higher build-up rates, shorter auxiliary processing times and larger installation spaces are primarily required.

Higher build-up rates can in principle be achieved by using higher laser powers. When increasing the laser power, however, material vaporisation occurs due to the high intensity at the processing location, which results in high splatter and soot formation and also deep-penetration welding, which leads to an unstable process and correspondingly poor component quality. Higher laser powers can therefore only be used in connection with larger beam diameters. However, this leads to a reduction of the surface quality and detail resolution. Therefore, what is known as the core/shell principle is currently used so as to use higher laser power. Here, the component shell is processed with low laser power (maximum 400 W) and small beam diameter (approx. 100 µm) for achieving the required surface quality and detail resolution. The component core is processed with larger beam diameter (approx. 700 µm) and higher laser power (1 kW) to achieve higher build-up rates. However, a higher build-up rate can only be achieved using this technology for solid components with significant core volumes. In addition, this technology makes it necessary that, to scale the process regarding higher laser power, the method parameters have to be worked out again for each new power class and each new beam diameter for each material in each case. When using higher laser powers, the high scanning speeds of >2 m/s required therefor also can no longer be achieved constantly, due to the inertia of the scanner mirrors. Furthermore, the intensity of the laser radiation on the optical components used, if 1 kW single mode lasers are used, is close to the destruction thresholds specified by the manufacturer. This results in a clear thermal shift of the focus position in the size of the Rayleigh length.

In the previously known systems, an enlargement of the installation space requires an enlargement of the scanning field. However, the scanning field of the scanners used is fundamentally limited by the maximum angle of rotation of the mirrors and also via the focal length of the focussing lens used. Enlarged installation spaces can in this case only be covered using a movable scanner or using a plurality of adjacent scanners across a plurality of scanning fields. However, this necessitates the development of novel scanning strategies for building up components in a defect-free manner in the overlap region of the individual scanning fields and means a significantly higher cost portion for optical components in larger installation spaces.

Both the increase of the laser power and the multiplication of the optical system for enlarging the installation spaces follow the approach of reducing the production time of SLM components in that the effective exposure time and therefore the main time in the process is reduced. However, in this case, the auxiliary processing time remains constant, which essentially corresponds to the sum of the duration of the individual powder applications. This auxiliary processing time scales in conventional selective laser melting with the number of layers and the dimensioning of the installation space in the powder application direction and cannot be used for the exposure.

The object of the present invention consists in specifying a device and a method for laser-based generative component production, which allows an improved scalability of the processing process with regards to laser power and installation space with lower costs than in the case of the previously known solutions.

DESCRIPTION OF THE INVENTION

The object is achieved with the device and the method according to the following description and claims. Advantageous configurations of the device as well as of the method are the subject matter of the dependent patent claims or can be drawn from the following description as well as from the exemplary embodiments.

The suggested device for generative component production has a processing head, using which a plurality of mutually separate laser beams are directed adjacently and/or overlapping to some extent onto the processing plane, in which the workpiece to be processed is provided. The device furthermore comprises a laser beam source arrangement, using which the mutually separate laser beams can be generated, a movement apparatus, which can generate a relative movement between processing head and processing plane in mutually parallel planes, particularly by moving the processing head across the processing plane, an apparatus for providing the material for the component in the processing plane and also a control apparatus, using which on the one hand, the movement apparatus for generating the relative movement can be controlled and on the other hand, mutually separate laser beams can be modulated independently of one another in terms of intensity, particularly in terms of power.

Using the suggested device, the processing or exposure of the material no longer takes place by means of an individual focussed laser beam, but rather by means of a plurality of laser beams, which can be modulated independently of one another in terms of intensity, which laser beams are directed onto the processing plane using the processing head, preferably are focussed into the processing plane. Here, focussing is understood to mean a reduction of the beam cross section of the laser beam, whereby the beam focus, i.e. the smallest beam cross section, can lie in or also outside of the processing plane. By moving the processing head across the processing plane, or the processing plane relatively to the processing head, with the aid of the movement apparatus, the laser beams are together moved across the processing plane. By means of corresponding modulation of the power in the case of constant focus diameter and a modulation of the intensity of the individual laser beams resulting therefrom during this exposure movement, particularly by means of switching on and off of the respective laser beams, the dimensions of the melt bath arising in the processing plane is influenced in such a manner that the exposed material regions correspond to the geometry of the component region to be created after the hardening thereof.

Preferably, the individual laser beams are directed by the processing head onto the processing plane in such a manner that overall, an elongated intensity distribution is obtained in the processing plane. Particularly preferably, a continuous intensity distribution is created from the laser beams using the processing head if all laser beams are connected via the control apparatus. This continuous intensity distribution is preferably realised in the form of a laser line, which is moved by means of the movement apparatus by moving the processing head across the processing plane in a direction perpendicular to the laser line. In this case, a continuous intensity distribution is understood to mean that the intensity within the exposed region does not fall below 10% of the maximum intensity in this region. The movement apparatus in this case preferably has one or two translation axes running perpendicularly to one another, which can for example be realised as linear axes and enable a corresponding movement of the processing head parallel to the processing plane. The processing head can alternatively also be moved across the processing plane by means of different movement apparatuses, for example with the aid of a robot arm. Furthermore, instead of the processing head, the processing plane can also be moved in a corresponding manner below the processing head.

The exposure concept of the suggested device is therefore based on the principle of a print head, using which an enlarged area in the processing plane compared to an individual laser is loaded by means of a plurality of adjacent laser beams. In this case, the individual laser beams are modulated dynamically in terms of intensity or power in accordance with the desired exposure geometry during the movement of the processing or print head, particularly is switched on and off accordingly.

The laser power used for the processing process can be scaled virtually arbitrarily to increase the build-up rate by means of this construction of the device. The increase in the laser power takes place in this case by increasing the number of simultaneously used laser beams and therefore by enlarging, particularly widening, the intensity distribution created in the processing plane using the processing head. An increase in the number of laser beams is connected with a corresponding enlargement of the processing head. The increase of the build-up rate can also be achieved by placing a plurality of processing heads next to one another. In both case, the total laser power is increased, without increasing the power and therefore the intensity of an individual laser spot created by one laser beam in the processing plane. As a result, the build-up rate for each material can be increased linearly with the installed laser power, without having to work out the method parameters again in each case. By avoiding scanner systems with movable mirrors, any desired installation space shape (e.g. quadratic, rectangular) with arbitrary dimensions can be covered without adapting the optical system or additional outlay for complex optical components. The adaptation to the dimensional size only takes place by adapting the travel paths of the movement apparatus, for example the linear axes of an apparatus operating with linear axes, and/or by increasing the number of laser beams and corresponding enlargement of the processing head. In this case, the intensity distribution created using the processing head, preferably a linear intensity distribution, can also be created over the entire width of the installation space, so that for example in the case of selective laser melting, the exposure of the powder layer can take place by moving the processing head along the longitudinal axis of the installation space with only one translation axis. Also, in the case of an intensity distribution, which does not extend over the entire width of the installation space, there is the option of moving the processing head in only one direction across the installation space. The movement of the intensity distribution in the direction perpendicular thereto can then take place via a scanning apparatus arranged on the processing head, particularly a movable beam deflection unit (for example a scanner mirror), which guides the intensity distribution in this direction across the installation space.

When using the suggested device for powder-based production methods, such as selective laser melting, the auxiliary processing times can also be reduced considerably. In the case of the previously known principle, the application of a new powder layer takes place by means of a separate powder application device after the exposure of a component layer. During the powder application, no exposure takes place and the beam source is not productive. Using the device suggested here and the associated method, the powder application can take place simultaneously with the exposure, in that the processing head is coupled to the axis for powder coating or the powder coating apparatus. In this case, the processing head follows the axis of the powder application at a fixed distance, so that the powder application takes place simultaneously with the exposure or processing. The auxiliary processing times can thereby be eliminated completely.

Compared to previous scanner-based systems, the scaling of dimensional size and laser power using the suggested device and the associated method is connected with significantly lower costs for the optical system. For installation space scaling, additional costs are only incurred for correspondingly longer linear axes for moving the processing head. The scaling of the laser power by increasing the number of beam sources can likewise be realised significantly more economically. Whilst in the case of the previous scanner-based concept, the beam quality of single mode lasers is required, in order to achieve the required focus value with the largest possible scanning field (due to the large focal lengths of the focussing lens), the focussing in the suggested device can take place with smaller focal lengths of the lenses, which lends itself to the use of more cost effective diode lasers as beam sources. The scaling of the laser power can take place linearly in units of a diode laser. Additional optical components are not required for the scaling. For certain uses, for example for laser sintering of polymers, surface-emitting semiconductor lasers (VCSEL: Vertical-Cavity Surface-Emitting Lasers) can also be used for realising the intensity distribution or a spot field.

In the suggested device, the laser arrangement can fundamentally also be integrated directly in the processing head, especially if diode lasers are used.

The suggested device and the associated method also offer the option of creating a plurality of laser lines or line spots in the movement direction of the processing head one behind the other and to form a corresponding intensity distribution or a spot field therefrom. Using this intensity distribution, a targeted temperature/time curve can then be set and created in the material using the plurality of spots lying one behind the other during the traversal of a processing point. A temperature/time curve of this type can for example be used for processing tear-prone materials, which could not hitherto be processed in a tear-free manner during processing with a single spot owing to the thermally induced stresses.

Preferably, in the suggested device, a processing head is used, which has one or a plurality of focussing optical systems, i.e. one or a plurality of focussing lenses or lens systems, through which the laser beams can be focussed into the processing plane. Preferably, in this case, the processing head has one optical fibre connection for each of the laser beams, which connection can then be connected to the laser arrangement via an optical fibre. The laser arrangement can for example have fibre-coupled diode lasers for creating the mutually separate laser beams. Of course, different laser types are also possible for creating the laser beams. The control of the intensity or power in the individual laser beams then takes place by controlling the corresponding laser. There is also the option to split the laser beam of a single beam source into a plurality of part beams, which can then be directed via the processing head onto the processing plane. In this case, an additional modulation element is then required in the beam path of the individual laser beams, in order to obtain the corresponding modulation. Splitting of a laser beam into a plurality of part beams can also take place in the processing head itself.

In a further configuration, an apparatus for protective-gas supply and/or exhaust, which is guided with the processing head, is provided above the processing plane. The melting of the powder material during selective laser melting takes place in a closed chamber, through which an inert gas flows. The inert gas prevents the oxidation of the melt. The flow additionally effects a transporting away of emissions (splatter, soot) from the interaction zone. For a uniform structure quality independently of the position of the component, a homogeneous flow is necessary across the entire installation space. This is becoming increasingly more complex to realise in the case of larger installation spaces. By coupling the apparatus for the protective-gas supply and/or exhaust to the processing head, a suitable local flow can be achieved in the interaction zone. The apparatus for protective-gas supply and/or exhaust can to this end have one or a plurality of nozzles, for example, and is preferably fastened to the processing head. Fundamentally, different elements can also be locally guided with the processing head, for example systems for online process monitoring, which must be realised in a complex manner by means of a coaxial arrangement via the optical system of the processing laser in previously known devices.

In the suggested method, which is preferably carried out using the suggested device, an elongated intensity distribution is generated from a plurality of separate laser beams in a processing plane and moved across the processing plane transversely to the longitudinal extent. In this case, the individual laser beams are modulated independently of one another in terms of intensity as a function of the desired processing during the movement, particularly are switched on and off. By means of the selected arrangement of the individual laser spots, the diameter thereof and the modulation of the power, the acting power density distribution is changed in such a manner spatially and temporally that the dimensions of the resulting melt bath are adapted to the component geometry to be created by means of the temperature field that is set in the material. Compared to the prior art, the suggested invention makes it possible to set the dimensions of the melt bath in the dimensions length, width and depth, independently of one another and dynamically change the same during the processing.

The desired exposure geometry in the processing plane is achieved by means of the mutually independent modulation of the intensity of the individual laser beams. Thus, during the selective laser melting or laser sintering, only those points or small regions, which are located within a powder region that belongs to the component cross section to be produced in the current layer, are exposed during the movement of the elongated intensity distribution across the powder bed in each case. The modulation of the intensity or power can also be carried out in such a manner that the intensity in the processing plane is only reduced to a sufficiently small value, at which the material is no longer melted, instead of being switched off.

The method can in principle also be carried out using a device, which guides the laser line formed from the individual laser beams across the processing plane by means of a scanner apparatus—for example formed from movable mirrors. Although this reduces the size of the installation space that can be processed, it has the advantage of increasing the laser power and shortening the build-up process.

The longitudinal axis of the elongated intensity distribution, laser line in particular, produced can in this case extend parallel to the powder application direction, termed y direction in the following, and is preferably then moved in a meandering manner across the powder bed. The longitudinal axis of the intensity distribution can also take in the entire width of the installation space and then only requires a straight-line movement perpendicular to the longitudinal axis, i.e. a movement in the y direction (powder application direction) across the powder bed. Here, the powder application can take place parallel to the exposure by means of a powder application device, which is offset in the direction of movement. Even in the case of a smaller extent of the intensity distribution, a simultaneous powder application of this type can take place. The movement of the powder application device is in this case coupled with the y component of the movement of the intensity distribution or the processing head.

The suggested method can principally be used in the field of powder-bed-based generative production methods, for example for selective laser melting or laser sintering. The fields of use in particular include the production of metal, ceramic or polymer components for the aviation, automotive and energy industry and also medical technology and tool making.

SHORT DESCRIPTION OF THE DRAWINGS

The suggested device and the associated method are explained in detail once more below on the basis of exemplary embodiments in connection with the drawings. In the figures.

WAYS OF REALISING THE INVENTION

In the suggested device, a processing head is used, using which a plurality of mutually separate laser beams are directed adjacently and/or overlapping to some extent onto a processing plane. As a result, an intensity distribution in the processing plane is created, which is composed of the individual spots of the laser beams. These spots can be located adjacently in the processing plane such that an interrupted or continuous laser line results. A two-dimensional field of the laser spots can also be created if required. The following example describes an exemplary device with a processing head in connection with FIGS. 1 to 3, in which five laser beams are used and directed with the processing head onto the processing plane, so that a laser line made up of the five adjacently located laser spots is obtained, which can be used for example for the selective laser melting. The exposure of the powder bed no longer takes place in this case by means of an individual focussed laser beam, but rather by means of the line made up of the focussed laser beams, which can be controlled independently of one another and are moved across the powder bed.

Figure 1:
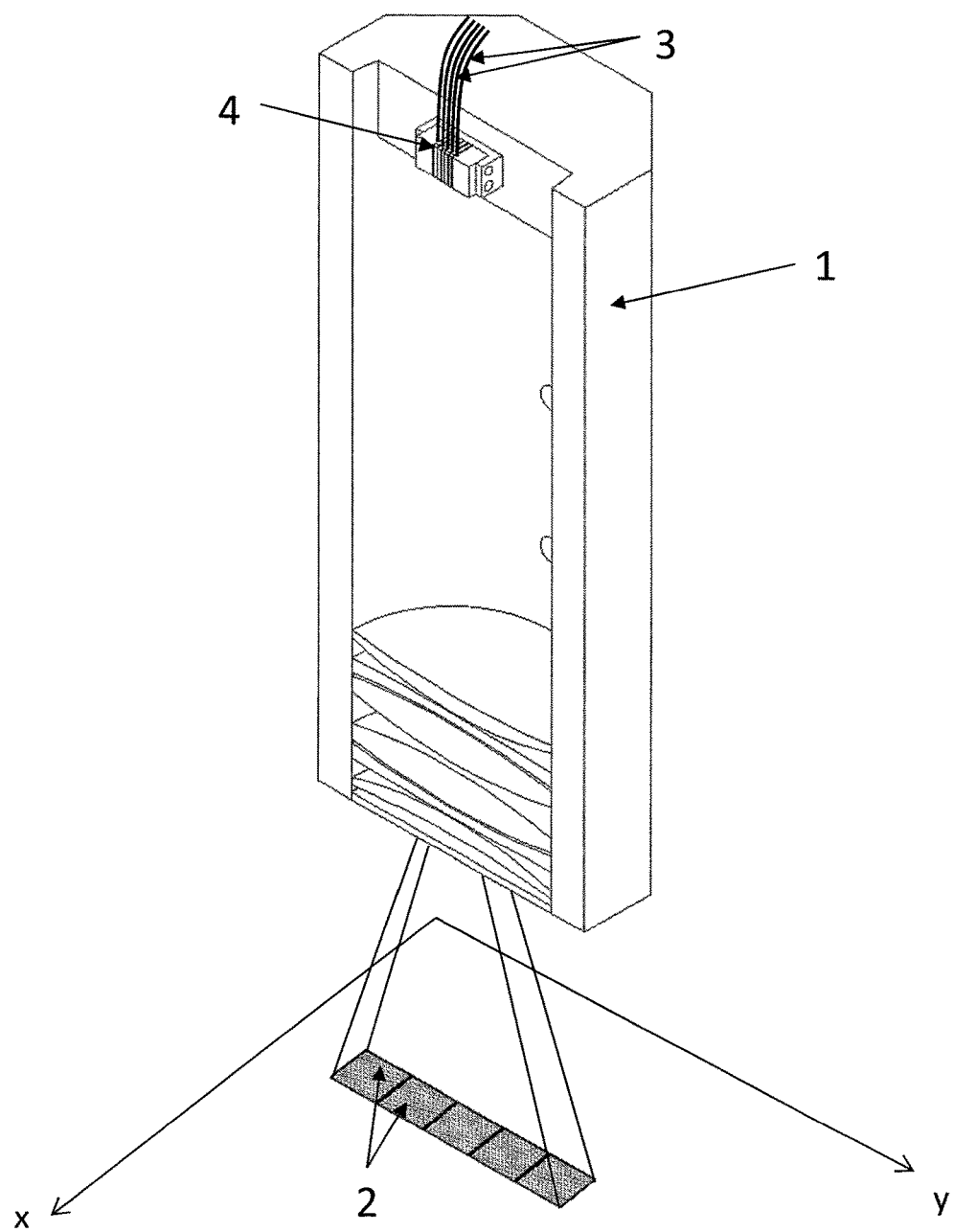
FIG. 1 shows a schematic illustration of a processing head of the suggested device for creating an intensity distribution from a plurality of laser spots in a processing plane.

To this end, FIG. 1 shows an example for a processing head 1, using which five laser spots 2 forming a laser line are created in the processing plane. The laser spots 2 are here in each case formed from fibre-coupled diode lasers 5, the radiation of which is guided via the optical fibres 3 to optical focussing elements 4 in the processing head 1 and is focussed using this focussing elements 4 onto the processing plane. In the case of laser melting, the processing plane corresponds to the surface of the powder bed. In the present example, the processing head 1 is moved in rows across the processing plane by means of linear axes in the x and y direction.

Figure 2:
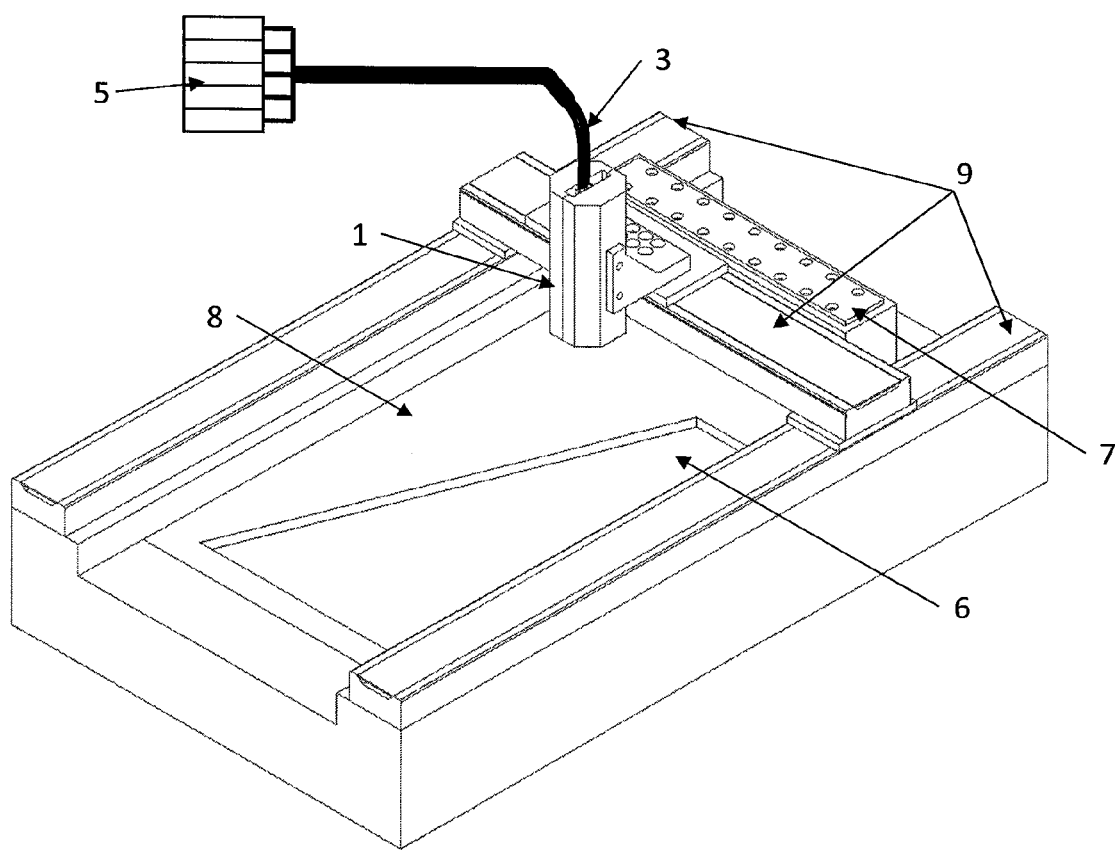
FIG. 2 shows an example for a design of the suggested device.
Figure 3:
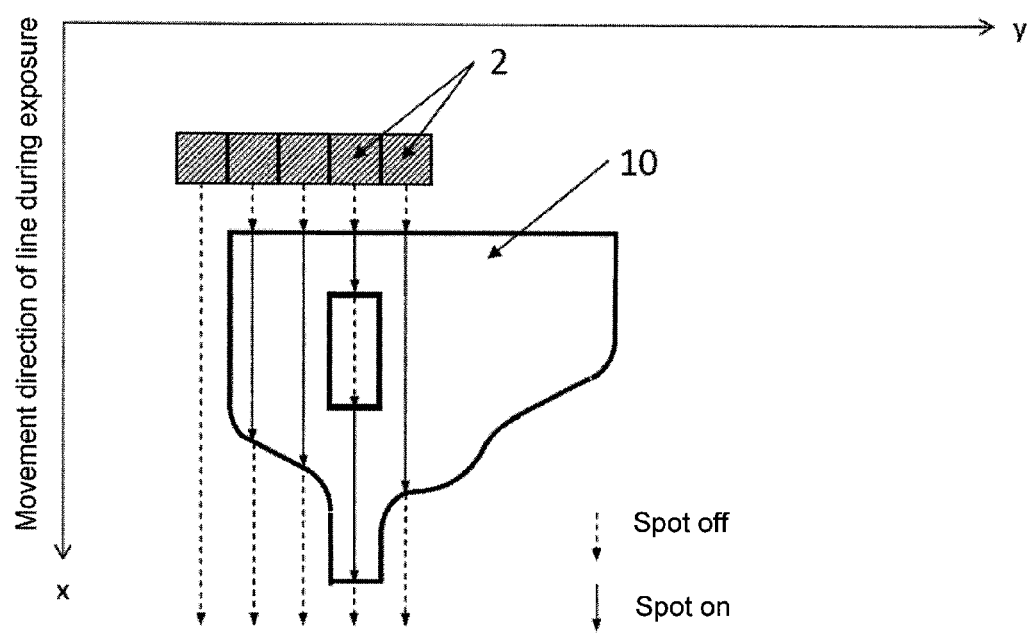
FIG. 3 shows a schematic illustration of the exposure of a component layer with the suggested device.

To this end, FIG. 2 shows an example for the device with the corresponding fibre-coupled diode lasers 5, which are connected via the optical fibres 3 to the processing head 1. The device illustrated in FIG. 2 comprises a building platform 6, which can be moved in terms of height, in a structure container, on which the component is built up. A new powder layer from a powder store is in each case distributed over the building platform by means of a powder application device 7, for example a slide, as is known from the known devices of the prior art. The figure also shows the three linear axes 9, via which the processing head 1 can be moved in the x and y direction across the part of the powder bed 8, which is located above the building platform. The movement directions are indicated in the figure with double arrows. In the present example, the powder application device 7 is fixedly coupled to the linear axis for movement in the y direction.

The control for exposing the regions to be melted takes place in the suggested device analogously to a print driver, i.e. each individual laser spot is switched on when passing over a region of the powder layer to be melted and switched off in the case of regions not belonging to the component. This is illustrated schematically on the basis of FIG. 3, which shows the laser line from the five laser spots 2 and the component layer 10 to be exposed. The line with the laser spots 2 is moved across the processing plane or the powder bed in the x direction in this example. The solid arrows show the regions, in which the corresponding laser spot is switched on, the dashed lines show the regions, in which the corresponding laser spot is switched off.

Figure 4:
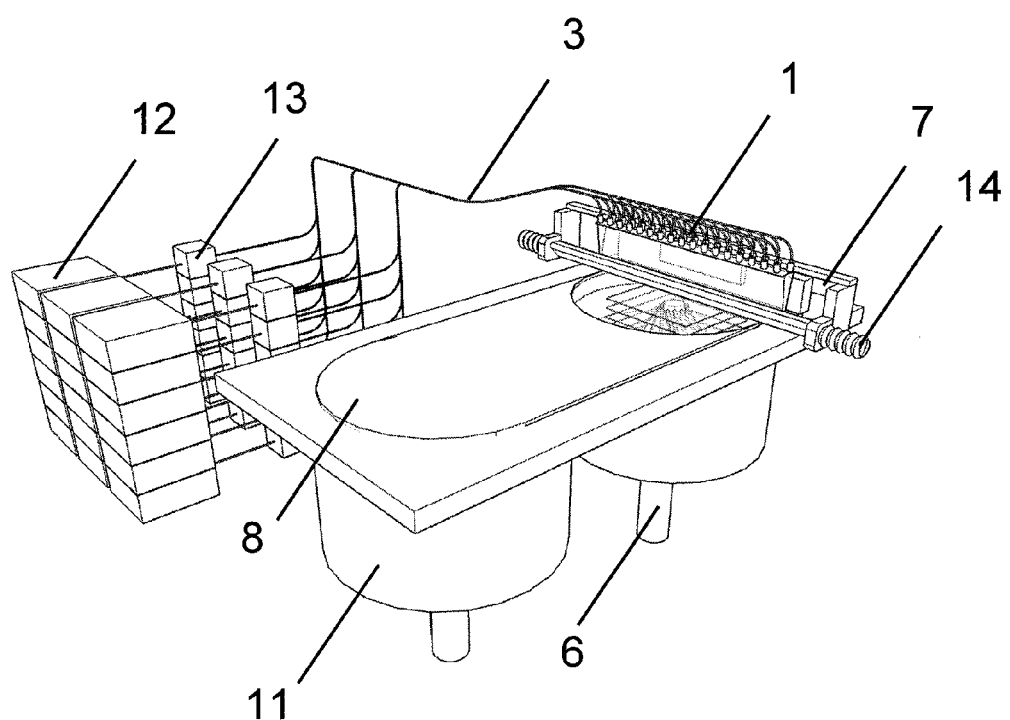
FIG. 4 shows a further example for a design of the suggested device.

FIG. 4 shows a further example for a configuration of the suggested device, in which, in addition to the structure container with the building platform 6, the powder storage volume 11 can also be seen. In this example, the laser arrangement consists of a plurality of laser beam sources 12, in the beam path of which, corresponding modulation apparatuses 13 are arranged. The processing head 1 in this case extends over the entire width of the installation space. An exhaust device 14 is also coupled to the processing head 1 in this example, which accordingly supplies protective gas and also exhausts any splatter and soot from the interaction zone. In this configuration, at the same time as the movement of the processing head 1 in the y direction, the powder application device 7 can also be moved in the same direction, in order, in this manner, to achieve the exposure simultaneously with the powder application. As a result, the auxiliary processing time for the powder application is completely eliminated.

REFERENCE LIST

1 Processing head
2 Laser spots
3 Optical fibres
4 Optical focussing elements
5 Fibre-coupled diode laser
6 Building platform
7 Powder application device
8 Powder bed
9 Linear axes
10 Component layer to be exposed
11 Powder storage volume
12 Laser beam sources
13 Modulation apparatuses
14 Exhaust device

The invention claimed is:

1. A device for generative component production, particularly for selective laser melting or laser sintering, comprising
    a processing head which uses a plurality of mutually separate laser beams which can be directed overlapping to some extent onto a processing plane,
    a laser beam source arrangement which uses the plurality of mutually separate laser beams which can be generated, an apparatus for providing a material in the processing plane, a movement apparatus which uses a relative movement between the processing head and the processing plane which can be generated in mutually parallel planes, and a control apparatus which uses the movement apparatus for generating the relative movement which can be controlled and the mutually separate laser beams of said plurality of mutually separate laser beams which can be modulated independently of one another in terms of intensity, wherein the processing head has one or a plurality of focussing optical systems, through which all laser beams of said plurality of mutually separate laser beams can be focussed in the direction of the processing plane, and directs the plurality of mutually separate laser beams onto the processing plane in such a manner that a continuous intensity distribution is obtained from the plurality of mutually separate laser beams in the processing plane, and wherein the control apparatus is constructed in such a manner that it modulates the intensity of the plurality of mutually separate laser beams as a function of a predetermined component geometry in each case.

2. The device according to claim 1, characterised
in that the processing head directs the plurality of mutually separate laser beams onto the processing plane in such a manner that an elongated intensity distribution is obtained from the plurality of mutually separate laser beams in the processing plane.

3. The device according to claim 1, characterised
in that the continuous intensity distribution is a laser line.

4. The device according to claim 1, characterised
in that the control apparatus is constructed in such a manner that it switches the intensity of the plurality of mutually separate laser beams for modulation on and off.

5. The device according to claim 1, characterised
in that the movement apparatus has a translation axis or two mutually perpendicular translation axes, via which the processing head can be moved in a plane parallel to the processing plane.

6. The device according to claim 1, characterised
in that the movement apparatus has a translation axis, via which the processing head can be moved in a direction parallel to the processing plane, wherein the processing head has a scanner apparatus, using which the laser beams can be guided in the direction perpendicular thereto across the processing plane.

7. The device according to claim 1, characterised
in that an installation space with a length and a width is present for component production, the movement apparatus has a translation axis, via which the processing head can be moved in a plane parallel to the processing plane across the length of the installation space, and the processing head extends over the entire width of the installation space.

8. The device according to claim 1, characterised
in that the processing head has one optical fibre connection for each of the plurality of mutually separate laser beams, which connection can then be connected to the laser beam source arrangement via an optical fibre.

9. The device according to claim 1, characterised
in that the apparatus for providing a material in the processing plane is coupled to the processing head, so that the apparatus for providing a material in the processing plane moves simultaneously with the movement component in a movement direction of the processing head.

10. The device according to claim 1, characterised
in that the laser beam source arrangement has a plurality of fibre-coupled diode lasers for creating the plurality of mutually separate laser beams.

11. A method for generative component production using a device in which a powdery material for the component is melted in layers by irradiation with laser radiation in a processing plane whilst forming a melt bath, comprising
providing a device which comprises
a processing head which uses a plurality of mutually separate laser beams which can be directed overlapping to some extent onto a processing plane,
a laser beam source arrangement which uses the plurality of mutually separate laser beams which can be generated,
an apparatus for providing a material in the processing plane,
a movement apparatus which uses a relative movement between the processing head and the processing plane which can be generated in mutually parallel planes, and
a control apparatus which uses the movement apparatus for generating the relative movement which can be controlled and the mutually separate laser beams of said plurality of mutually separate laser beams which can be modulated independently of one another in terms of intensity,
wherein the processing head has one or a plurality of focussing optical systems, through which all laser beams of said plurality of mutually separate laser beams can be focussed in the direction of the processing plane, and directs the plurality of mutually separate laser beams onto the processing plane in such a manner that a continuous intensity distribution is obtained from the plurality of mutually separate laser beams in the processing plane, and
wherein the control apparatus is constructed in such a manner that it modulates the intensity of the plurality of mutually separate laser beams as a function of a predetermined component geometry in each case; and
generating an elongated intensity distribution for the irradiation of the material in the processing plane from laser spots of all the laser beams of said plurality of mutually separate laser beams, which are focussed in the direction of the processing plane, and is moved across the processing plane, and wherein the individual laser beams are modulated in terms of intensity, particularly are switched on and off, during the movement such that the melt bath created in the processing plane is adapted in terms of the dimensions thereof to the geometry of the component region to be created in each case.

12. The method according to claim 11, characterised in that the elongated intensity distribution is generated over the entire width of an installation space used for the production of the component.

* * * * *

UNITED STATES PATENT AND TRADEMARK OFFICE
CERTIFICATE OF CORRECTION

PATENT NO. : 9,827,632 B2
APPLICATION NO. : 14/647509
DATED : November 28, 2017
INVENTOR(S) : Eibl et al.

Page 1 of 1

It is certified that error appears in the above-identified patent and that said Letters Patent is hereby corrected as shown below:

In the Claims

Column 9, (Claim 1), after Line 11, please insert --an apparatus for gas supply and/or gas exhausting is coupled to the processing head or fastened on the processing head and thus said apparatus for gas supply and/or gas exhausting moves simultaneously with the processing head;--

Column 10, (Claim 11), after Line 43, please insert --coupling an apparatus for gas supply and/or gas exhausting to the processing head or fastened on the processing head so as to move simultaneously therewith;--

Signed and Sealed this
Twelfth Day of June, 2018

Andrei Iancu
*Director of the United States Patent and Trademark Office*